Oct. 17, 1939.  G. T. FORBES  2,176,762
METHOD OF MAKING FLEXIBLE HOSE
Filed July 15, 1937

INVENTOR.
GEORGE T. FORBES
BY Kwis Hudson & Kent
ATTORNEYS

Patented Oct. 17, 1939

2,176,762

UNITED STATES PATENT OFFICE 2,176,762

METHOD OF MAKING FLEXIBLE HOSE

George T. Forbes, Cleveland, Ohio, assignor of one-half to R. H. Schwartz Rubber Corporation, Cleveland, Ohio, a corporation of Ohio, and one-half to The Ohio Rubber Company, Willoughby, Ohio, a corporation of Ohio Application July 15, 1937, Serial No. 153,778

6 Claims. (Cl. 154—8)

This invention relates to improvements in method of making flexible hose.

The conventional method of producing lightweight reenforced flexible hose comprises winding spring wire spirally on a mandrel or pole of the same diameter as the internal diameter of the finished hose, the convolutions being spaced apart the required distance, and the ends of the wire being taped or otherwise fastened to the pole, covering the tightly wound wire coil with a wrapping, usually of rubber-impregnated cloth with a considerable overlap at the joint, then placing a winding of wire, cord or yarn on the exterior of the wrapping, this outer winding being positioned in the spiral groove between convolutions of the inner reinforcement, fastening down the ends of this winding, vulcanizing the article while on the pole, and then removing the article from the pole. The stripping of the hose from the pole is a difficult operation, because the tightly wound wire, held against expansion by the wrapping and outer winding, grips the pole firmly. In order to remove it usually two workmen at opposite ends of the pole twist the hose in opposite directions in an endeavor to loosen up the convolutions of the wire to produce an internal diameter of the coil sufficient to permit the hose being drawn and pushed off the pole. Damage to the hose frequently results, causing considerable scrap material. Also, the spring wire of the finished hose being under a heavy force of expansion, tends to burst the wrapping. Furthermore, because of the tightly stretched condition of the wrapping due to the expanding tendency of the reenforcement, the capacity for additional stretching around the outside of any bend in the hose is limited. Hence the flexibility of the hose is correspondingly limited.

One of the objects of the present invention is the provision of a hose in which the reenforcing spring wire is in a state of rest, as distinguished from a state where it tends to expand, thereby eliminating the tendency to burst the wrapping and providing a greatly increased flexibility permitting extremely short bends in the hose.

Another object is the provision of a method of manufacturing hose of this character which steps up the speed of production with consequent lower costs, reduces greatly the amount of waste and scrap, and by lessening the necessary overlap in the wrapping effects a saving in material.

Other objects and features of novelty will appear as I proceed with the description of the article and the method of producing the same as illustrated in the accompanying drawing, in which Fig. 1 is a fragmental elevational view of a reeling machine which may be employed in connection with the invention, and illustrating the first step of the method.

Fig. 2 is a side or plan view of a mandrel or pole upon which a coil of wire is tightly wound and the ends of the wire fastened down by tape or the like.

Figure 1:
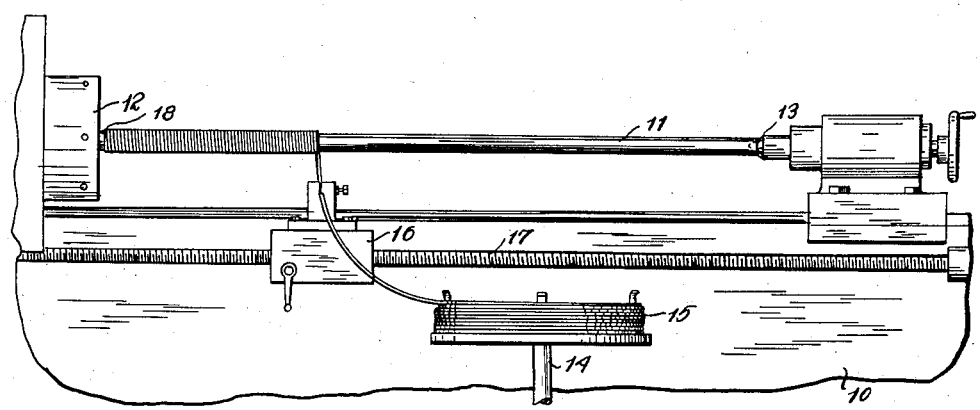
Figure 2:

In Fig. 1 of the drawing the bed of a reeling machine is indicated at 10. 11 is a mandrel or pole mounted at one end in a live center 12 and at the other end in a dead center 13. 14 is a reel holder which rotatably supports a coil of wire 15 in a position to conveniently feed it to a traversing guide 16, which may be operated by hand or automatically through the intermediacy of a screw 17, as will be readily understood by those skilled in the art. The pole 11 is of a diameter considerably smaller than the internal diameter of a finished hose. For example, where the finished hose is to be of 1¼" internal diameter I use a first pole of $2\%_2$" for a given gauge and grade of spring wire. The pole 11, which may be conveniently a piece of steel tubing, may be 9' long, the usual length in machines of this kind.

In beginning the operation of winding spring wire on the pole, the end of the wire is fastened to the pole near the left end thereof, as by means of friction tape 18. The guide 16 is then set at the proper point and the machine started. Adjustments of the machine are such as to wind the wire tightly on the pole with the adjacent convolutions touching each other. This winding of the wire is a simple and easy operation requiring little or no skill upon the part of the operator, as distinguished from the conventional operation where the convolutions of the wire must be spaced apart the required distance by means of a spacing bar held in the hand of the operator. Furthermore, since the convolutions are close together sufficient wire may be wound on one pole and in one operation to reenforce several 9′ lengths of hose. I determine by experiment for any given size of hose and any given gauge of wire what length of coil on the pole 11 is required for one hose length. I then wind on the pole a multiple of that length. When the required length of coil is wound I stop the machine, tape down the end of the coil as indicated at 19, cut the wire, and remove the pole from the machine.

Figure 3:
Fig. 3 shows a fragment of the wire coil after being permitted to expand to a state of rest.

The next step is to release one end of the closely wound coil 20 by removing one or the other of the tapes 18 or 19. The wire then, by reason of the heavy strains set up within it by the winding operation, unwinds itself partly and increases its diameter considerably, the convolutions also separating themselves to some extent. The expanded coil, which is then in a state of rest, is now removed from the pole and cut into the proper lengths for use in making up the individual lengths of hose. If desired, this cutting operation may be performed while the coil is still supported on the pole 11 and before it is permitted to expand. The internal diameter of the coil, shown at 21 in Fig. 3, is now slightly greater than the internal diameter of the finished hose. I prefer to have it about $\frac{1}{16}$ of an inch larger.

Figure 4:
Fig. 4 is a similar view showing a length of wire on a finishing mandrel or pole, the wire being stretched lengthwise to extend from one end to the other of the pole and to provide the desired spacing between convolutions.
Figure 5:
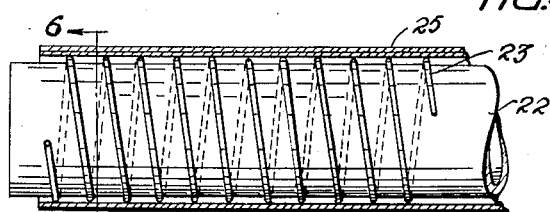
Fig. 5 is a fragmental view on a larger scale after the coil of wire has been covered with a wrapping of rubberized cloth.
Figure 6:
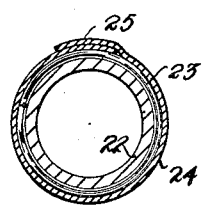
Fig. 6 is a transverse sectional view of the same taken substantially on the line 6—6 of Fig. 5.
Figure 7:
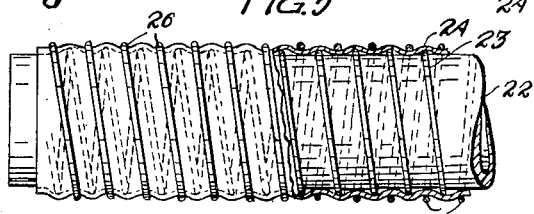
Fig. 7 is a view partly in elevation and partly in longitudinal section showing an outer winding in place on the hose between convolutions of the inner spiral spring reenforcement.
Figure 8:
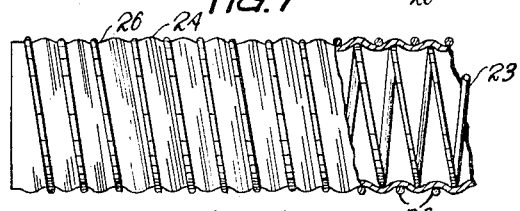
Fig. 8 is a similar view of a fragment of the finished hose.

Now one section of coil 21 is placed upon a pole 22 of the same diameter as the internal diameter of the finished hose. There being $\frac{1}{32}$ of an inch clearance all around, no difficulty is experienced in getting the coil onto the pole. The coil is then pulled lengthwise until it is stretched from one end of the pole to the other, and its ends are fastened to the pole by any convenient means. It then has the form illustrated at 23 in Fig. 4.

The stretching of the coil lengthwise necessarily reduces its diameter somewhat, but when the proper selection of size of the first pole 11 for a given wire gauge is made there is still a small clearance between the stretched coil and the pole 22, the difference in diameter being preferably about $\frac{1}{64}$ of an inch. Next the operator takes a strip of friction cloth 24, that is to say rubberized fabric, and wraps it around the coil 23. This strip is of a width sufficient to permit an overlap 25. However, as there is no constant strain upon the cloth, as in the conventional hose, it is not necessary to have any considerable overlap. As a matter of fact, I have found that I can effect an important saving in material on this account.

As the next step in the process, I may put a winding 26 of cord or yarn around the outside of the wrapping 24 between the convolutions of the coil 23. This step of the method however may be omitted if desired, with a consequent saving in cost, since the wrapping 24 is not under a stretching strain and does not require the outer winding, as does the conventional hose, in order to offset to some extent at least the tendency toward bursting.

The next operation is to place the pole 22, with the coil 23, wrapping 24 and winding 26 in position thereon, in an open steam vulcanizer for the purpose of curing the wrapping. After vulcanization, the hose is stripped from the pole, this operation being a relatively easy one because of the clearance between the coil 23 and the pole. In accordance with my method there is practically no scrap resulting from the stripping operation. The process is then complete.

While, for the purpose of complying with the requirements of the statute, I have described somewhat in detail the particular embodiment illustrated, it is to be understood that variations may be resorted to without departing from the spirit of the invention and its definition in the appended claims.

Having thus described my invention, I claim:

1. The method of making thin-walled reenforced hose, which comprises winding spring wire upon a pole of less diameter than the inner diameter of the hose, permitting the coiled wire to expand to the approximate diameter desired, removing the coil from the first pole and placing it upon a pole of approximately the same diameter as the inner diameter of the finished product, covering the coil with a wrapper of flexible material, and removing the finished hose from the pole.

2. The method of making thin-walled reenforced hose, which comprises winding spring wire upon a pole of less diameter than the inner diameter of the hose with the convolutions of the wire close together, permitting the coiled wire to expand radially to its natural diameter, removing the coil from the pole and placing it upon a pole of approximately the same diameter as the inner diameter of the finished product, expanding the coil lengthwise to provide the desired spacing between convolutions and to cause the convolutions to loosely embrace the pole, covering the coil with a wrapper of flexible material, and removing the finished hose from the pole.

3. The method of making thin-walled reenforced hose, which comprises winding spring wire upon a pole of less diameter than the inner diameter of the hose with the convolutions of the wire close together, continuing the winding until the length of the wire in the coil is sufficient for a plurality of hose sections, permitting the coiled wire to expand radially to a larger diameter, removing the coil from the pole, cutting it into lengths suitable for the hose sections, placing one coil section upon a pole of approximately the same diameter as the inner diameter of the finished product, expanding said coil section lengthwise to provide the desired spacing between the convolutions and to cause the convolutions to loosely embrace the pole, covering the coil with a wrapper of flexible material, removing the finished hose from the pole, and then proceeding in the same manner with each of the remaining coil sections.

4. The method of making thin-walled reenforced hose, which comprises winding spring wire upon a pole of less diameter than the inner diameter of the hose, permitting the coiled wire to expand to the approximate diameter desired, removing the coil from the first pole and placing it upon a pole of approximately the same diameter as the inner diameter of the finished product, wrapping the coil with rubber-impregnated cloth, vulcanizing the wrapper in place on the coil over the pole, and removing the finished hose from the pole.

5. The method of making thin-walled reenforced hose, which comprises winding spring wire upon a pole of less diameter than the inner diameter of the hose with the convolutions of the wire close together, permitting the coiled wire to expand radially to its natural diameter, removing the coil from the pole and placing it upon a pole of approximately the same diameter as the inner diameter of the finished product, expanding the coil lengthwise to provide the desired spacing between convolutions and to cause the convolutions to loosely embrace the pole, wrapping the coil with rubber-impregnated cloth, vulcanizing the wrapper in place on the coil over the pole, and removing the finished hose from the pole.

6. The method of making thin-walled reenforced hose, which comprises winding spring wire upon a pole of less diameter than the inner diameter of the hose with the convolutions of the wire close together, continuing the winding until the length of the wire in the coil is sufficient for a plurality of hose sections, permitting the coiled wire to expand radially to a larger diameter, removing the coil from the pole, cutting it into lengths suitable for the hose sections, placing one coil section upon a pole of approximately the same diameter as the inner diameter of the finshed product, expanding said coil section lengthwise to provide the desired spacing between the convolutions and to cause the convolutions to loosely embrace the pole, wrapping the coil with rubber-impregnated cloth, vulcanizing the wrapper while in place on the coil over the pole, removing the finished hose from the pole, and then proceeding in the same manner with each of the remaining coil sections.

GEORGE T. FORBES.